March 6, 1934.          A. KOPITZKI          1,949,967
KNIFE EDGE BEARING
Filed Oct. 15, 1931
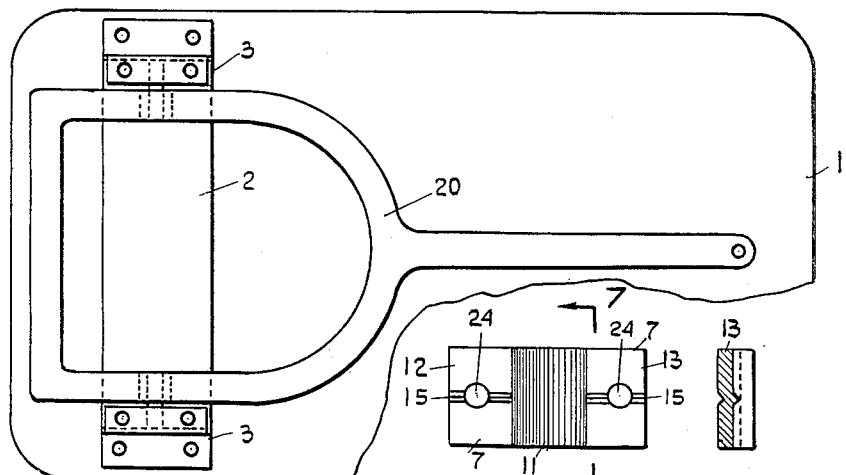
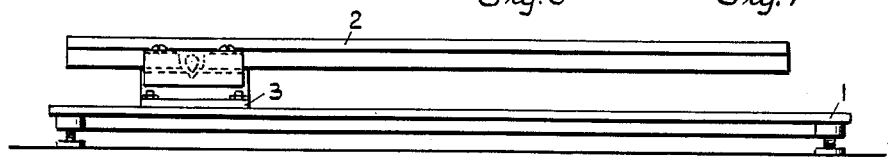
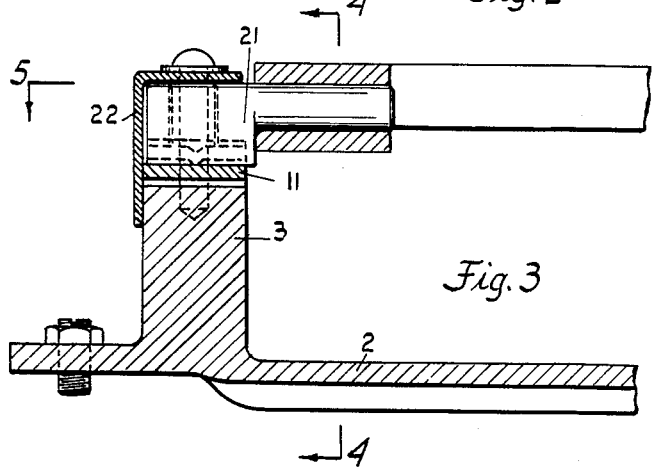
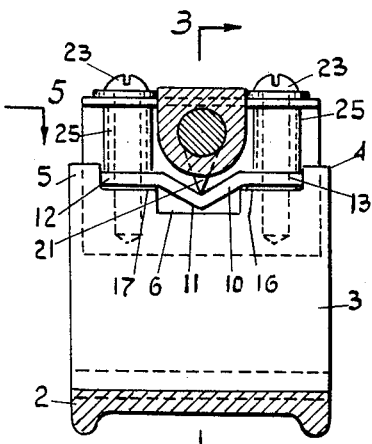
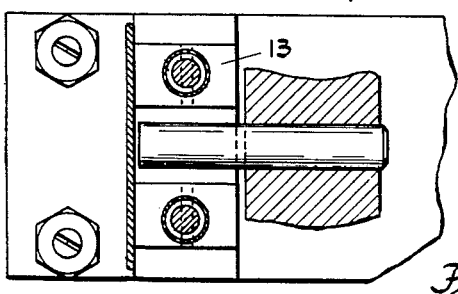
INVENTOR.
ALOYSIUS KOPITZKI
BY Barnes & Kisselle
ATTORNEYS.

Patented Mar. 6, 1934

1,949,967

UNITED STATES PATENT OFFICE 1,949,967

KNIFE EDGE BEARING

Aloysius Kopitzki, Detroit, Mich., assignor to Barnes Scale Company, Detroit, Mich., a corporation of Michigan Application October 15, 1931, Serial No. 568,994

3 Claims. (Cl. 308—2)

This invention has to do with bearings and the method of making the same. This invention is concerned particularly with a bearing of the type commonly termed a knife edge bearing and used largely in scales.

The principal object of this invention is the provision of a bearing which is of simple construction and which can be provided at low manufacturing cost; the objects of the invention also include provision of a method of making a bearing part designed to receive a knife edge wherein such bearing parts may be made under manufacturing costs lower than the cost heretofore. These and other objects will become more apparent as the detailed description progresses.

In the accompanying drawing:

Figure 1 is a plan view showing a platform and a lever for a scale.

Figure 2 is a side elevation thereof.

Figure 3 is a sectional view taken through the bearing structure substantially of line 3—3 of Figure 4.

Figure 4 is a section along line 4—4 of Figure 3.

Figure 5 is a section of line 5—5 of Figure 3.

Figure 6 is a plan view of a bearing part.

Figure 7 is a detailed section taken on line 7—7 of Figure 6.

The method can perhaps be best described in relation to the structural features of the invention and accordingly the structure will be first described. A supporting base for a scale is illustrated at 1, and mounted thereon is a bearing supporting member or yoke 2 having a pair of spaced upstanding arms 3. This supporting member 2 with its arms may be an integral piece of metal, cast or forged, and the top portion to form a recess defined by projections 4 and 5 (Figure 4), said recess being deepened in its center portion as at 6. A bearing member 10 having a V-shaped bearing formation as at 11 is fitted in the recess, and its overall length is sufficient to preferably snugly fit between portions 4 and 5. Its end portions 12 and 13 rest upon the bottom surface of the more shallow portion of the recess; preferably the end portions 12 and 13, are depressed in a direction at right angles to the V-bearing 11 so as to form a projection ridge 15 on each part thus giving a line contact as between the portions 12 and 13 and the supporting ledges. For convenience these supporting ledges are given reference characters as at 16 and 17.

A lever, such as the main load lever of a scale is illustrated at 20, and on opposite sides, has a knife edge bearing 21 seated in the V-bearing 11 on each side. For completing the assembly, an angle plate 22 may be located so that one leg of its angle overlies the knife edge bearing 21; screws 23 may be taken through the angle covering 22 through apertures 24 in the bearing member and threaded into the arm 3 for which purpose the arm 3 is drilled and tapped. Spacer elements in the form of sleeves 25 may be placed around the screws and located between the bearing member and the cover flange for the bearing. The other leg of the angle cover covers the end of the member 21.

This completes the structural arrangement of the parts and the simplicity of the structure will be appreciated. While the bearing member 10, in its present form is preferably snugly engaged between the projections 4 and 5, to the end that the V-bearing may be properly located, it is held in this position by the screws 23; likewise these same screws hold the angle cover plate 22. The arm of the angle cover plate which overlies the bearing of the cover plate 21 is spaced sufficiently above the top of the bearing 21 to permit a free movement thereof, yet so as to prevent the knife edge from jumping out of its V-bearing; this is determined by the sleeves 25. The apertures 24 in the bearing member are preferably so located that the contact members 15 cross the apertures diametrically. It may be seen that inasmuch as the bearing rests upon a line contact, it is capable of rocking somewhat. In equipping the lever arm 20 with opposed knife edges, it is probable that at times these two knife edges in their spaced relation will not be exactly on a given line but may be tilted slightly one with respect to the other. Of course, such disalignment is very slight, and due to the fact that the bearing member 10 rests upon line contacts, they are free to rock and adjust themselves independently to their respective knife edges. The screws 23 are located quite tightly and tend to prevent any substantial rocking of the bearing, but very slight rocking may occur which is quite sufficient to permit the bearing members to adjust themselves to their respective knife edges.

The method is concerned particularly with the making of the bearing member. The method contemplates making these bearings from relatively inexpensive stock as for example, relatively low carbon steel such as cold rolled steel. In the making of the bearing the first operation is to shear a proper length from cold rolled steel stock. The overall length of the blank is slightly greater than the distance between the projections 4 and 5. This blank is then acted upon by suitable dies, or the like for shaping the same and forming the V-bearing proper; at the same time the metal may be depressed so as to form the line contact portions 15. The apertures 24 may next be provided in the blank or the apertures may be provided at some other step in the process.

With the bearing blank thus formed and shaped, it is subjected to a hardening process, particularly a case hardening process, so that its hardened exterior, particularly the bearing where the knife edge seats provides adequate wearing qualities. Actual experience has shown that during this case hardening of the bearings there is no substantial warping in them with the result that upon the completion of the case hardening process the bearings are ready for installation. However, if any warpage occurs, the hardened bearing may be again subjected to a forming press and be reshaped.

It will be remembered that the initial blank which was sheared from the cold rolled stock was of a length greater than the distance between the projections 4 and 5. This length is shortened by the die work in forming and shaping the blank, and the dimensions are preferably so calculated that when the blank is thus shortened, it is of just the right length to tightly fit into the milled portion of the support between the projections 4 and 5. The bearings are interchangeable in that they may be used on either side of the machine; thus, it is not necessary to make the bearing in rights and lefts. Furthermore, by means of this process the bearings can be made sufficiently accurate so that they are readily interchangeable which permits of quickly replacing a bearing which is worn out or defective with a new bearing, without involving any machining or fitting operations.

I claim:

1. A bearing structure for a scale or the like comprising a support having a recess in its upper surface, said recess being deepened in its central portion to provide horizontal supporting ledges on opposite sides of the deepened portion, a bearing member having a V bearing proper located in said deepened portion of the recess and adapted to receive a knife edge bearing member, said bearing member having ends extending from the V bearing proper and resting upon the ledges, and means providing a line contact between said bearing member ends and said ledges.

2. A bearing structure for a scale or the like comprising a support having a recess in its upper surface, said recess being deepened in its central portion to provide horizontal supporting ledges on opposite sides of the deepened portion, a bearing member having a V bearing proper located in said deepened portion of the recess and adapted to receive a knife edge bearing member, said bearing member having ends extending from the V bearing proper and resting upon the ledges, the ends of said bearing member being shaped to provide projections, one on each end and disposed in a direction at right angles to the V bearing proper and on substantially the center line of the bearing for providing a line contact between said ends of the bearing and said ledges.

3. A bearing member for a scale or the like comprising a body substantially of sheet metal form with its central portion fashioned into a V bearing proper and adapted to receive a knife edge bearing member, the end portions of the member extending oppositely from the V bearing proper, said end portions having each a rib formed therein substantially on the transverse center line of the bearing member and extending in a direction at right angles to the V bearing proper, said ribs being adapted to rest upon a support and furnish a line contact upon which the bearing member may rest.

ALOYSIUS KOPITZKI.